No. 721,055. PATENTED FEB. 17, 1903.
C. J. LIPPOLD.
TWINE HOLDER.
APPLICATION FILED FEB. 19, 1902.
NO MODEL. 2 SHEETS—SHEET 1.
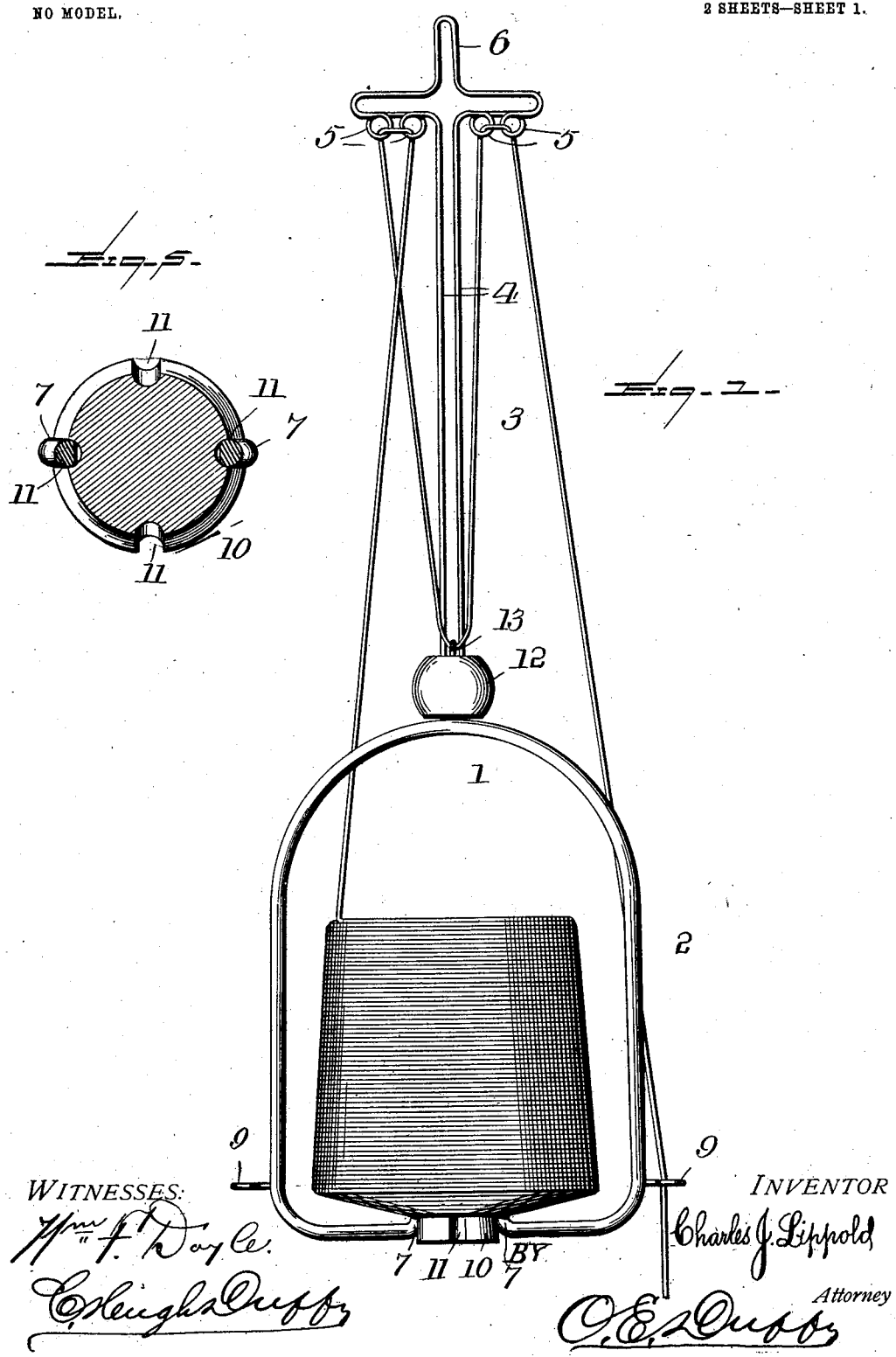
WITNESSES: INVENTOR
Charles J. Lippold
Attorney No. 721,055. PATENTED FEB. 17, 1903.
C. J. LIPPOLD.
TWINE HOLDER.
APPLICATION FILED FEB. 19, 1902.
NO MODEL. 2 SHEETS—SHEET 2.
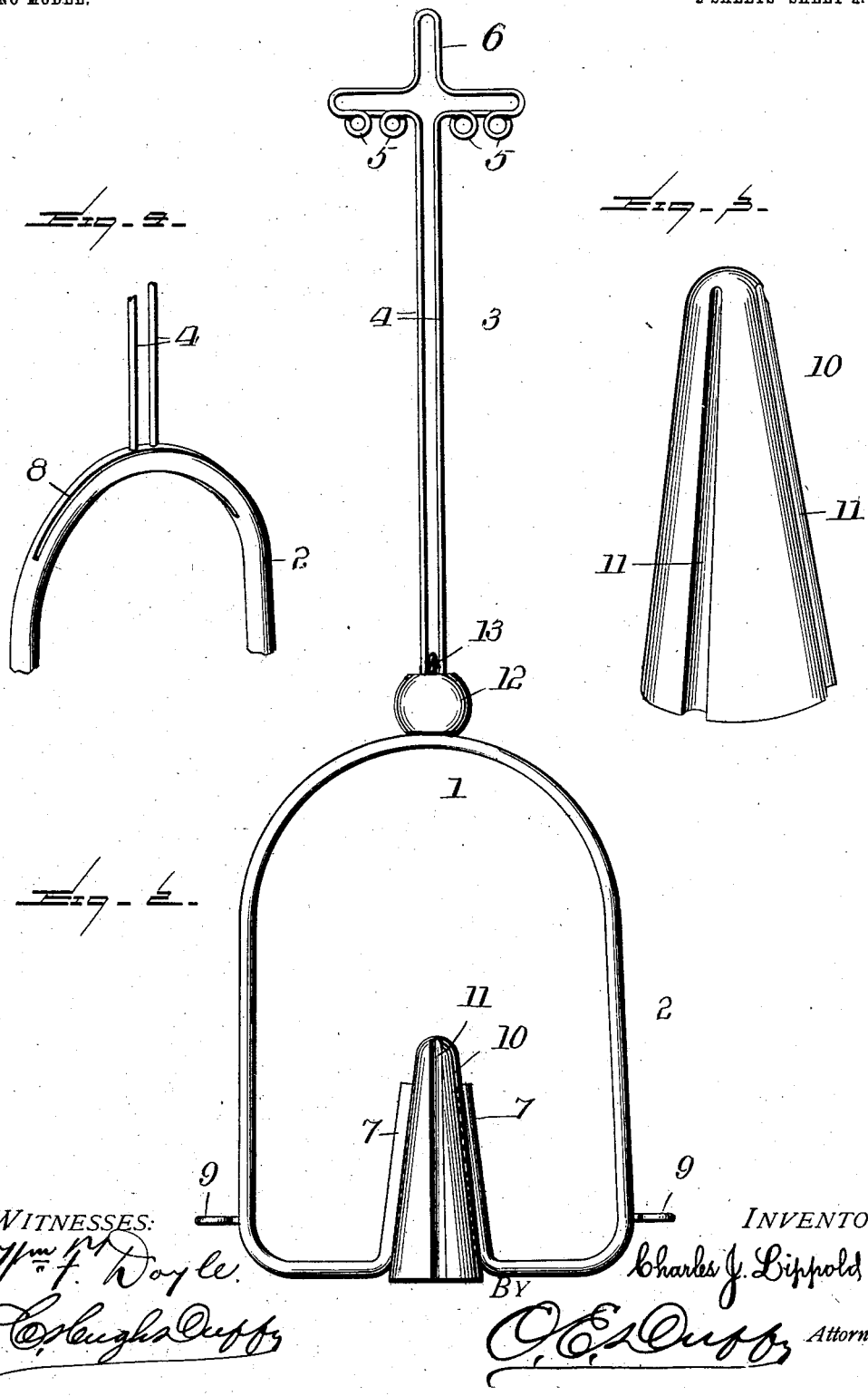
WITNESSES: INVENTOR
Wm. F. Doyle. Charles J. Lippold
Hugh Duffy BY
C. E. Duffy Attorney

UNITED STATES PATENT OFFICE.

CHARLES J. LIPPOLD, OF WASHINGTON, DISTRICT OF COLUMBIA.

TWINE-HOLDER.

SPECIFICATION forming part of Letters Patent No. 721,055, dated February 17, 1903.

Application filed February 19, 1902. Serial No. 94,812. (No model.)

*To all whom it may concern:*

Be it known that I, CHARLES J. LIPPOLD, a citizen of the United States, residing at Washington, in the District of Columbia, have invented certain new and useful Improvements in Twine-Holders; and I do hereby declare the following to be a full, clear, and exact description of the invention, such as will enable others skilled in the art to which it appertains to make and use the same.

My invention relates to twine-holders, and has for its object to provide a device of this class which will take up the end of the twine after a portion has been broken off.

A further object of my invention is to provide a device, as above stated, which is adapted to carry cones of twine instead of balls.

A further object of my invention is to provide the holder adjustable, so as to accommodate itself to cones of different sizes, the openings in the said cones varying with the size of the cones.

With these objects in view my invention consists principally in the adjustable twine-holder.

My invention also consists in certain other novel features of construction and in combination of parts, which will be first fully described and afterward specifically pointed out in the appended claims.

Referring to the accompanying drawings, Figure 1 is an elevation of my twine-holder in an operative position. Fig. 2 is an elevation of the same with twine detached, showing adjustable mandrel. Fig. 3 is a detail perspective of mandrel. Fig. 4 is a fragmentary perspective of the central portion of the holder, showing twine-guiding slot; Fig. 5, horizontal section of mandrel.

Like numerals of reference indicate the same parts throughout the several figures, in which—

1 is my holder, composed of the lower or twine-holding portion 2 and the upper suspending and take-up portion 3. Said portion 3 is constructed, preferably, of a single piece of wire forming the guide-rods 4, which are bent outwardly at right angles at their tops to form the rings 5, after which the wire extends inwardly and then upwardly to form the suspension part 6. The lower or twine-holding portion 2 is constructed of metal somewhat heavier than the piece just described and is rounded at its top and formed with straight sides. The ends thereof are then carried inwardly at right angles and then upwardly, the ends converging. The upwardly-converging end portions 7 have their adjacent sides flattened, so that when the two ends are brought together the two ends will be oblong in cross-section. The central portion of the top of twine-holding portion is provided with two holes for the reception of the guide-rods. I prefer this construction; but obviously the rods may be attached in other ways. To one side of these holes I provide a slot 8, extending some distance to either side thereof for the purpose of guiding the twine as it is leaving the cone, and at the bottom I provide an eye 9 on each side to guide the twine as it is being used.

The mandrel 10 is preferably circular and formed like a cone, with four grooves 11 in the sides thereof, within two of which the converging end portion 7 enters, while the other two are for the purpose of causing the cone of twine to be held more securely on the mandrel.

12 indicates a ball having an opening through its center and provided with a staple 13 at its top, said ball being adapted to travel on the guide-rods and carrying the twine in the staple which is between said guide-rods.

Having thus described the several parts of my invention, its operation is as follows: The cone of twine is placed over the converging ends 7 of the holder, and the mandrel is then inserted from beneath between said ends 7, the grooves therein registering with the said ends. Said mandrel is then pushed up and by reason of its wedge or cone shape spreads the ends 7, causing them to engage the interior of the twine cone and itself also engaging the said interior, firmly and securely holding the twine in position. It is obvious that the larger the opening in the twine cone the farther the mandrel must be inserted, while in the case of a small opening the mandrel is inserted only a short distance and in some instances is not used at all when the opening in the cone is very small, as in this case the converging ends are pressed together and the twine is slipped on, the tendency of the ends to spread securely holding the twine in position. The twine having been affixed, the end thereof is passed through the slot 8 and upwardly and through one of the inside rings 5, then to the outer ring and down through the staple 13 in the ball 12, thence upwardly through the inside and outside rings 5 on the opposite side of the guide-rods. My object in carrying the twine directly from the slot 8 to the inside ring and then to the outside ring is to increase the tension of the twine, so as to obviate a too-free unwinding of the same. The end of the twine is then carried through one of the eyes on the bottom of the holder, which prevents the free end from wrapping around or interfering with the holder.

Having thus described my invention, I do not wish to be understood as limiting myself to the exact construction set forth; but

I claim as my invention and desire to secure by Letters Patent of the United States—

1. The combination with twine-take-up means, of a twine-holding portion having free ends, a twine-holding mandrel adapted to be inserted between the free ends thereof to directly engage the cone in the twine, said mandrel being provided with grooves registering with the twine-holding portion.

2. The combination with twine-take-up means of a twine-holding portion, free ends thereon having a normal tendency to separate and adapted to engage the cone of the twine, a cone-shaped mandrel adapted to be inserted between said ends, and the cone of the twine adapted to be directly engaged by said mandrel.

3. The combination with twine-take-up means of a twine-holding portion having free ends, the cone of the twine adapted to be engaged thereby, a cone-shaped mandrel adapted to be inserted between said ends and to directly engage said cone of the twine.

4. The combination with twine-take-up means, of a twine-holding portion, a cone-shaped mandrel provided with grooves of a depth less than the cross-section of the twine-holding portion, and adapted to directly engage the cone of the twine, the whole arranged whereby said twine-holding portion is spread to engage the cone of the twine.

5. The combination with twine-take-up means of a twine-holding portion, a cone-shaped mandrel, free ends on said twine-holding portion adapted to support said cone-shaped mandrel and to be held in engagement with the twine by said mandrel.

In testimony whereof I affix my signature in presence of two witnesses.

CHARLES J. LIPPOLD.

Witnesses:
C. HUGH DUFFY,
WM. I. EVANS.